MULTI-DRINK LOCKING GATE PROTECTION DEVICE

Filed Oct. 29, 1956 4 Sheets-Sheet 1

INVENTOR.
Elmer C. Johnson
BY
ATTORNEY

Aug. 4, 1959 E. C. JOHNSON 2,898,001

MULTI-DRINK LOCKING GATE PROTECTION DEVICE

Filed Oct. 29, 1956 4 Sheets-Sheet 2

INVENTOR.
Elmer C. Johnson

BY [signature]
ATTORNEY

Aug. 4, 1959 E. C. JOHNSON 2,898,001

MULTI-DRINK LOCKING GATE PROTECTION DEVICE

Filed Oct. 29, 1956 4 Sheets-Sheet 3

INVENTOR.
Elmer C. Johnson
BY
[signature]
ATTORNEY

Aug. 4, 1959 E. C. JOHNSON 2,898,001

MULTI-DRINK LOCKING GATE PROTECTION DEVICE

Filed Oct. 29, 1956 4 Sheets-Sheet 4

INVENTOR.
Elmer C. Johnson
BY [signature]
ATTORNEY

United States Patent Office 2,898,001

Patented Aug. 4, 1959

2,898,001

MULTI-DRINK LOCKING GATE PROTECTION DEVICE

Elmer C. Johnson, Kansas City, Mo., assignor to The Vendo Company, Kansas City, Mo., a corporation of Missouri Application October 29, 1956, Serial No. 619,048

8 Claims. (Cl. 221—125)

This invention relates to improvements in vending machines in the nature of those disclosed in U.S. Letters Patent No. 2,766,906 issued October 16, 1956 in the names of Floyd V. Bookout, et al., the said disclosure being incorporated herein and forming a part hereof by reference.

Article vending machines to which the instant invention relates and as disclosed in the aforementioned patent, permit selection from a number of differing types of articles upon insertion of a coin or other medium to operate coin-control mechanism that in turn automatically "unlocks" the structure for normally preventing access to the merchandise.

Through use of captive mechanism, including for example a plurality of reciprocable devices, retaining gates are released upon insertion of the coin, the captive mechanism being operable to permit removal of but one article at a time from the machine.

The captive mechanism and the associated parts of the machine disclosed in said patent has proved to be fully effective in preventing "jack potting" and other attempted thievery, but its perfection has resulted in some disadvantages having to do chiefly with an occasional loss of the inserted coin by a customer without receiving merchandise in return therefor. In the event a purchaser during operation of the machine disclosed in the above-mentioned patent decided to select another article after having partially removed an article of his first selection, or if for some reason the article being removed, slipped from his grasp back into the storage compartment, such unintended and improper operation of the machine might result in loss of the inserted coin without delivery of an article of merchandise.

It is the most important object of the instant invention, therefore, to overcome the aforementioned difficulties while at the same time maintaining the same degree of perfection against pilfering as contained in the structure of the said prior patent.

Another important object of the instant invention is the provision of captive mechanism and associated parts for vending machines which automatically remains unlocked during outward movement of the article and return by the customer to the end that if the latter should either slip back or be returned to its initial position in the storage cabinet, the purchaser is still able to obtain the article without need of inserting another coin.

Another object of the present invention is to provide captive mechanism and locking structure which is inoperative so far as permitting reciprocation of the captive devices upon removal of the article of merchandise from the storage compartment by the customer.

A further object of the instant invention is to provide an assembly of parts operable in the aforementioned manner so far as holding the captive devices unlocked is concerned, but which is highly sensitive to attempted pilfering under such conditions, thereby at no time permitting the removal of more than one article of merchandise for each coin insertion.

Figures 1, 2:
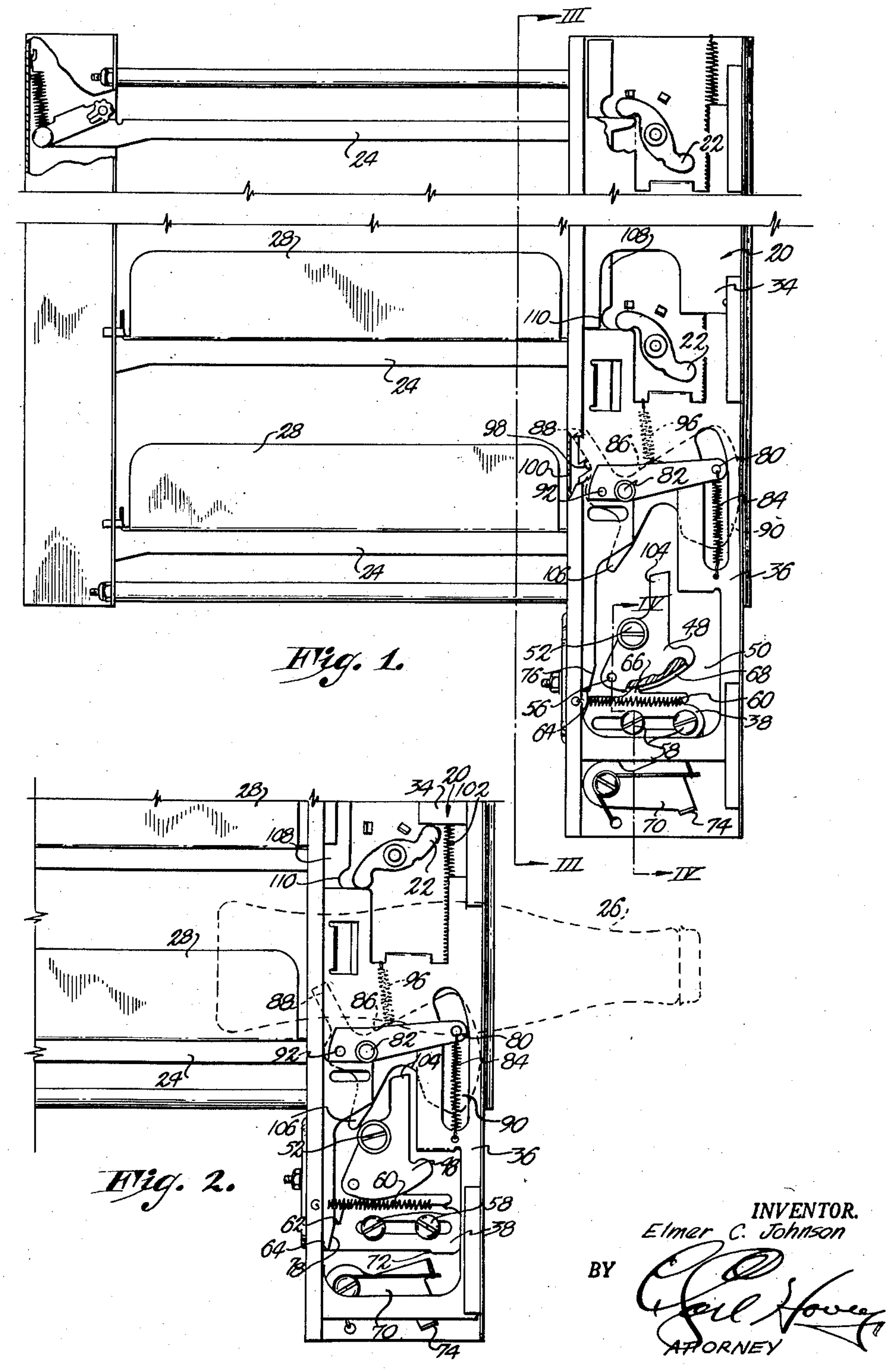
Figure 1 is a fragmentary, side elevational view of selective article vending mechanism including a multi-drink locking gate protection device made pursuant to the present invention and showing all parts in a normal stand-by condition.
Fig. 2 is a fragmentary, elevational view similar to Figure 1 showing the position of the parts of the selective mechanism during the initial removal of an article of merchandise.

In all essential respects article retaining shelves 16, swingable locking gates 18 (Fig. 3), captive mechanism 20, oscillating dogs 22 and swingable divider bar 24 (Fig. 1) are the same in the instant disclosure as provided for in the patent hereinabove initially identified.

Figures 3, 4, 5:
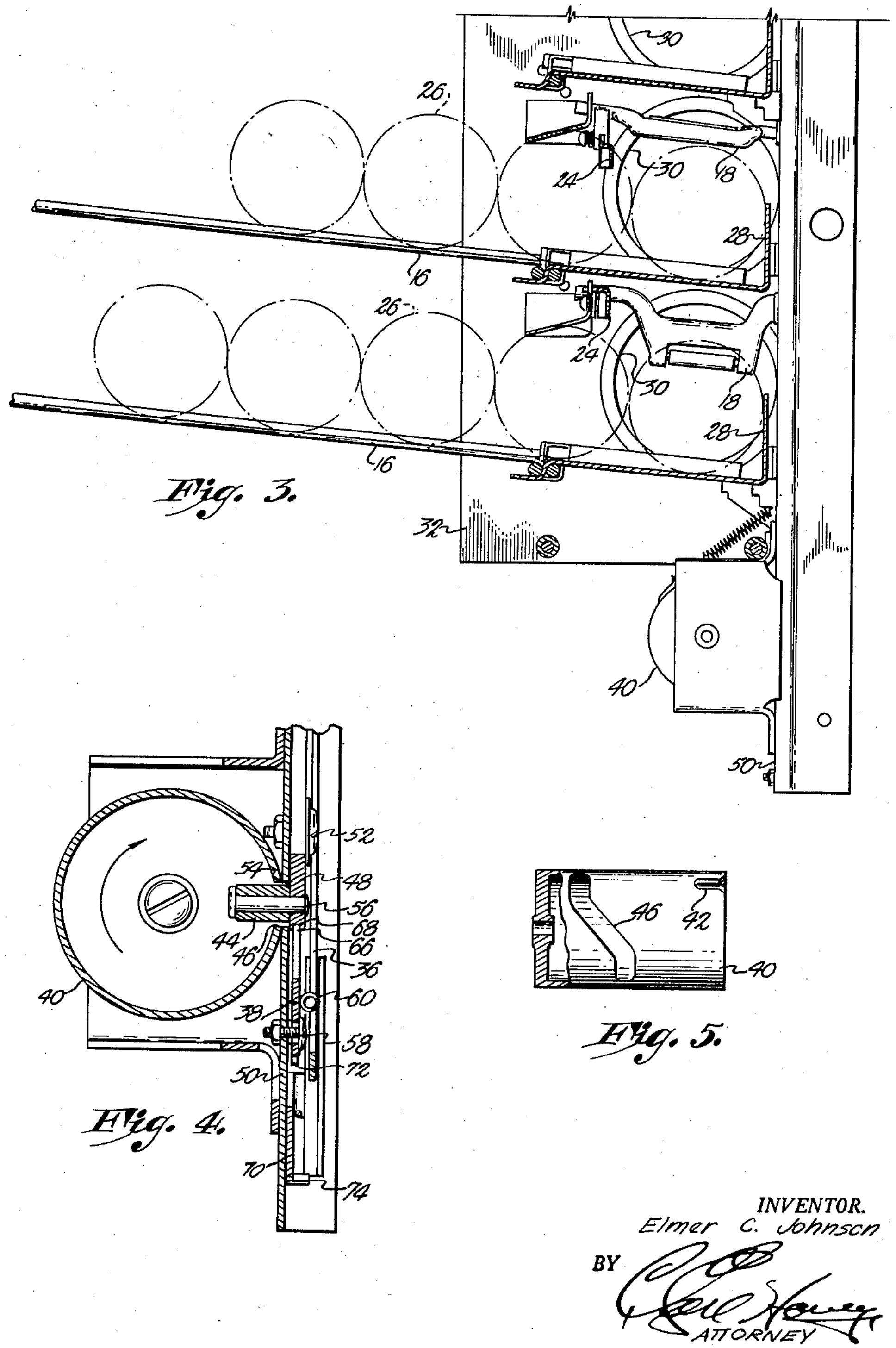
Fig. 3 is a cross-sectional view taken on line III—III of Figure 1.
Fig. 4 is a fragmentary, detailed, cross-sectional view still further enlarged taken on line IV—IV of Figure 1.
Fig. 5 is a plan view of a rotatable cylinder forming a part of the locking mechanism showing the same in the position thereof illustrated by Figure 1, parts being broken away and in section for clearness.

The series of articles 26 such as bottled beverages, slide or roll along the inclined shelves 16 to an upstanding abutment 28 as seen in Fig. 3 where the lowermost of the articles 26 are all vertically aligned and accessible through corresponding openings 30 in front panel 32. The gates 18 normally extend across each opening 30 respectively but upon unlocking of the captive mechanism 20, a selected one of the articles 26 may be removed in the manner shown in Fig. 2, thereby swinging the corresponding gate 18 outwardly and upwardly as seen in Fig. 3.

Each gate 18 has one of the dogs 22 rigidly secured thereto for swinging movement therewith and when a gate 18, together with its dog 22, is swung to the open position, the divider bar 24 corresponding thereto, swings downwardly to a position retaining the remaining articles of the shelf against movement toward abutment 28.

It is clear from the disclosure of said patent also, that the captive mechanism 20 includes a plurality of substantially H-shaped, vertically reciprocable plates 34, together with a master plate 36, all normally held against vertical reciprocation by lock means 38 underlying the master plate 36. When lock means 38 is released however, any one of the dogs 22 is free to swing under influence of its gate 18 swinging outwardly and upwardly as an article 26 is removed. When a dog 22 is rotated from the position shown in Figure 1 to the position shown in Fig. 2, the two proximal plates 34—34 or 34—36, as the case may be, spread apart, thereby locking all of the remaining plates 34 against further reciprocation and preventing removal of additional articles while one of the gates 18 is held open by the article being removed.

As in the selective mechanism of said patent, the initial operation commences with insertion of a coin or other medium into coin-control mechanism (not shown) which in turn releases a crank, handle or the like to be manipulated by the customer. Such manually manipulable structure includes a shaft that is coupled with cylinder 40 by means of slots 42 in the latter upon closure of the loading door forming a part of the cabinet within which the selective mechanism is housed.

Rotation of cylinder 40 swings a roller 44 (Fig. 4) riding in cam slot 46 of cylinder 40, to in turn swing an element 48 anti-clockwise viewing Figure 1, that is in turn mounted on guide frame 50 for the captive mechanism 20 by means of pivot pin 52. A slot 54 in the guide frame 50 clears the roller 44, the latter of which is attached to the element 48 by pin 56.

Lock means 38 is also carried by the guide frame 50 between the latter and the master captive plate 36 and includes a reciprocable slotted plate carried by pins 58 on the guide frame 50 and yieldably held biased in its operative position toward the left-hand end of its path of travel, viewing Figs. 1 and 2, by a spring 60 interconnecting the locking plate 38 and the guide frame 50. One end of the plate 38 is provided with an upwardly facing shoulder 62 against which a downwardly facing shoulder 64 on plate 36 engages whenever plate 38 is in the position shown in Figure 1 and whenever an attempt is made to remove an article 26 together with attempted downward movement of plate 36 in absence of insertion of a coin.

Plate 38 is provided with an ear 66 extending into a groove 68 of device 48 and which is engaged by the pin 56 during swinging movement of the element 48 to withdraw the plate 38 against the action of spring 60 from the position shown in Figure 1 to a position where shoulder 64 is free to move downwardly without engagement with shoulder 62. Upon such release of the lock plate 38, a spring-loaded latch 70 carried by the guide frame 50, moves into a position engaging shoulder 72 on plate 38 to hold the latter released. When master plate 36 moves downwardly, the lowermost edge thereof contacts an ear 74 on latch 70 to release the latter as inclined edge 76 of plate 36 engages a similarly disposed edge 78 on the plate 38 to move the latter still further to the right against the action of spring 60.

It can be seen that after an article 26 has been moved to the position shown in Fig. 2, any return thereof to its shelf 16 will automatically cause all parts to reassume the position shown in Figure 1, thereby preventing the customer from making another selection. Furthermore, once the latch 70 has been released, it is not possible to make another selection regardless of the speed of withdrawal or return of the article 26.

In accordance with the improvements disclosed in Figs. 1 to 12 inclusive therefore, there is provided a bar 80 swingably mounted on master plate 36 through a pivot pin 82 and yieldably biased downwardly by a spring 84 interconnecting the plate 36 with one of its outermost free ends.

Figure 11:
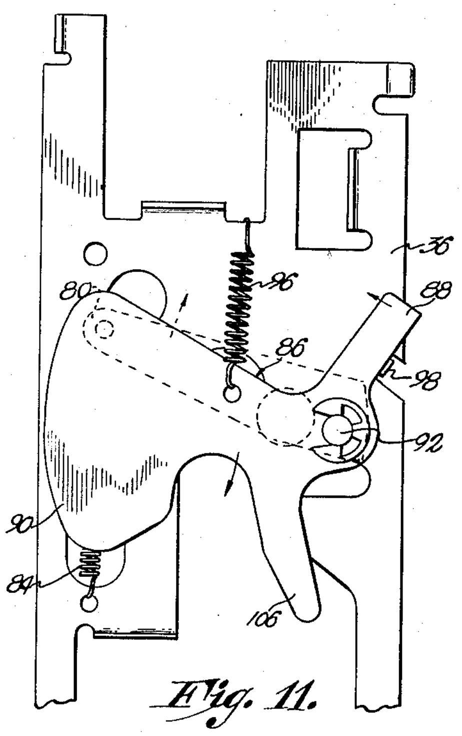
Fig. 11 is an elevational view showing the opposite face of the parts illustrated in Fig. 10.
Figure 12:
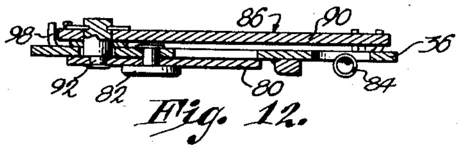
Fig. 12 is a cross-sectional view taken on line XII—XII of Fig. 10.

The bar 80 supports a swingable plate 86 disposed on the opposite face of the plate 36 and including a locking finger 88, together with a counterweight portion 90. A pivot pin 92 cleared by slot 94 in the plate 36 swingably mounts the plate 86 on the bar 80. A spring 96 interconnecting the plate 86 and the plate 36 yieldably biases the plate 86 toward one end of its path of travel limited only by a stop 98 on the plate 36 and engaged by finger 88 as seen in Fig. 11. The finger 88 is disposed for engagement within an opening 100 formed in one edge of the guide frame 50 as illustrated in Figs. 6 to 9 inclusive.

Figure 6:
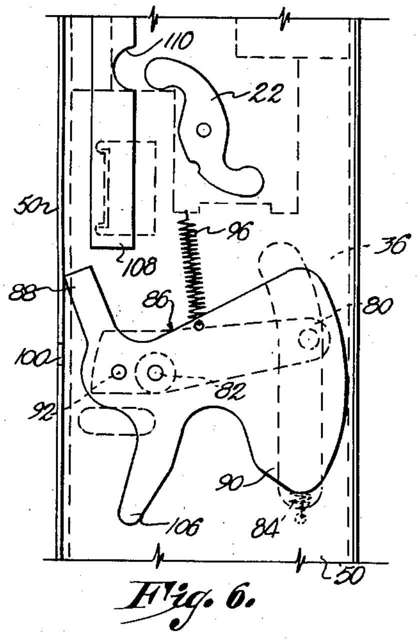
Fig. 6 is an enlarged, fragmentary, elevation view showing the counterweight element of the protection device with the master plate upon which it is mounted and other associated parts in phantom.
Figure 7:
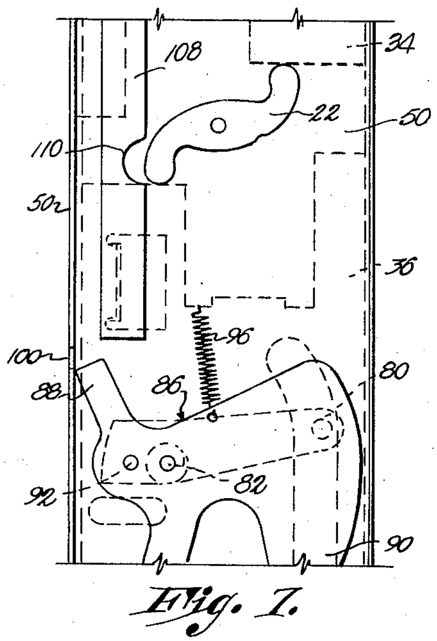
Fig. 7 is a view similar to Fig. 6 but showing the position of the protection device during removal of an article as seen in Fig. 2.
Figure 8:
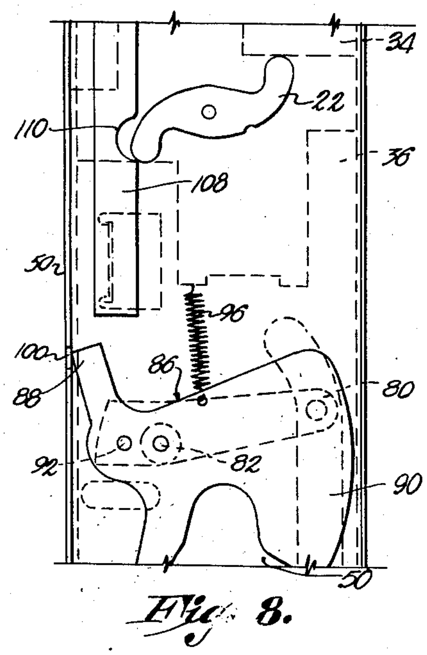
Fig. 8 is a view similar to Figs. 6 and 7 but showing the position of the protection device during its return to the position shown in Fig. 6 when the article is removed rapidly.

As seen in Fig. 6, when the plate 36 and, therefore, bar 80 and plate 86, are at the uppermost ends of their paths of travel, the finger 88 is well above the opening 100. However, as seen in Fig. 7, during removal of an article 26, when plate 36 is moved to the lower end of its path of travel, finger 88 moves to a position below the opening 100. Thereupon, if the article 26 is removed rather rapidly and in the normal manner to permit plate 36 to move to the upper end of its path of travel by virtue of a spring 102 (Fig. 2) attached thereto, the finger 88 will clear the opening 100. This action is effected by virtue of the counterweight 90 tending to swing the plate 86 clockwise (viewing Fig. 8) as plate 36 is returned rapidly to the upper end of its path of travel by spring 102. In other words, rapid acceleration upwardly of plate 36 and the inherent inertia of the mass forming counterweight 90, causes plate 86 to spring downwardly as aforementioned.

On the other hand, if the article 26 is returned whereby the plate 36 moves upwardly at a rate which does not cause swinging movement of the plate 86 against the action of spring 96, the finger 88 will slide along the edge of the guide frame 50 and enter the opening 100.

This permits reinsertion of the article 26 and subsequent removal notwithstanding the fact that the lock 38 is released. If perchance the article 26 is entirely removed without releasing the finger 88 from the opening 100, subsequent insertion of a coin and operation of element 48 causes finger 104 of the latter to move against finger 106 on the plate 86, thereby releasing finger 88 from the opening 100 and snapping of the plate 36 to the upper end of its path of travel under influence of spring 102.

In the event further that an attempt is made to pry upwardly on the divider bar 24 while its associated gate 18 is open in order to remove the remaining articles on shelf 16, the finger 88 will be tripped by virtue of the action of bar 80. It is understood that upward prying movement on the divider bar 24 tends to move a bar 108 upwardly and since the latter is connected at its lowermost end to the master plate 36, the latter will also tend to move upwardly.

Figure 9:
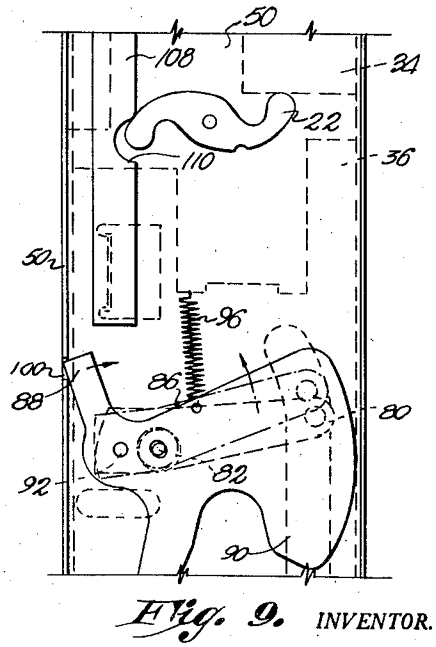
Fig. 9 is a view similar to Figs. 6–8 but showing the protection device locked.
Figure 10:
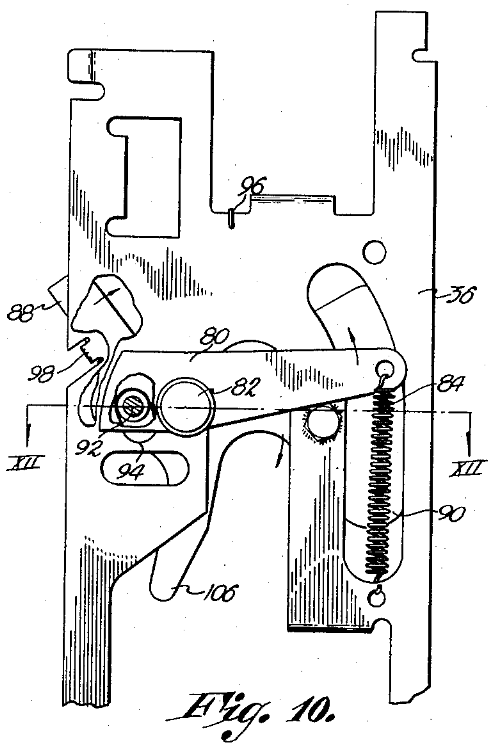
Fig. 10 is a view similar to Fig. 1 still further enlarged and illustrating the master plate of the captive devices with the protection means thereon.

It is to be understood that the bar 108 is provided with notches 110 for receiving the dogs 22 as the latter are actuated as shown in Fig. 9 and for the same purpose as outlined in the aforementioned patent. As plate 36 is forced upwardly, bar 80 swings against the action of spring 84 because of the fact that finger 88 is within opening 100 and pivot pin 92 is free to shift to the lower end of slot 94. Continued upward movement of the link 36 causes the stop 98 to withdraw the finger 88 from the opening 100. Therefore, any force supplementing that of the spring 102 in returning the plate 36 to its initial standby position shown in Figure 1, will tend to withdraw the finger 88 from the opening 100.

Figure 14:
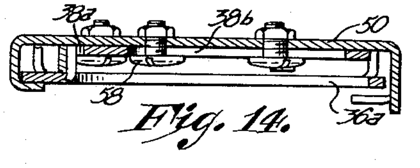
Fig. 14 is a cross-sectional view taken on line XIV—XIV of Fig. 13.
Figures 13, 15:
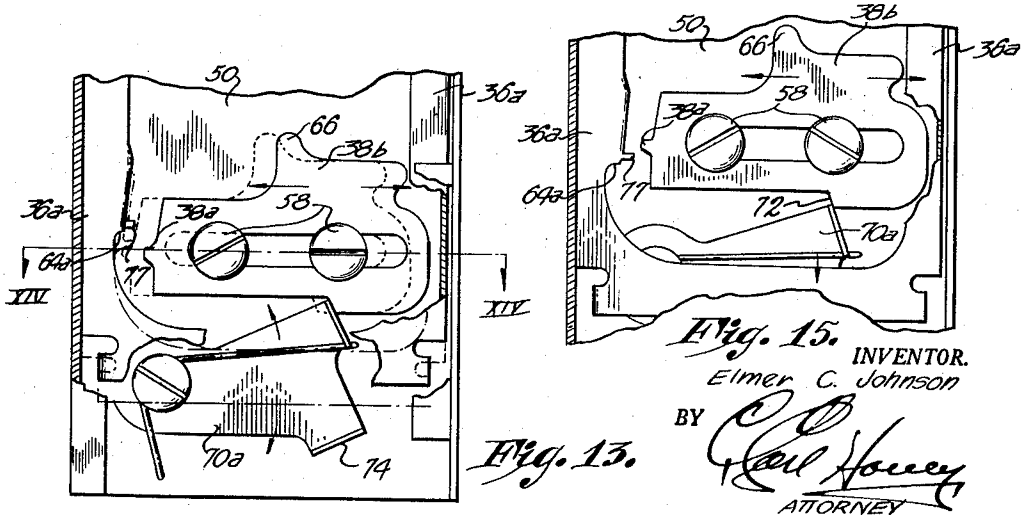
Fig. 13 is an enlarged, fragmentary, elevational view similar to Fig. 2 showing a modified form of the instant invention.
Fig. 15 is a view similar to Fig. 13 showing the parts in another position.

In Figs. 13 to 15 inclusive there is provided in lieu of the finger 88, a pair of protuberances including an extension 77 on plate 36*a* adjacent its shoulder 64*a*, together with an ear 38*a* on locking plate 38*b*. As shown in Figs. 13 and 15, the ear 38*a* is disposed to clear the extension 77 whenever locking plate 38*b* is held retracted by swingable spring-loaded latch 70*a*. As soon as the customer commences removing the article and pulls the same sufficiently to move master plate 36*a* downwardly to the lower end of its path of travel, extension 77 is disposed beneath ear 38*a*.

Consequently, as plate 36*a* swings the latch 70*a* downwardly, lock 38*b* will be released, thereby placing ear 38*a* directly above the extension 77. If the bottle-removing action is not completed, the ear 38*a*, by virtue of its configuration, will hold the plate 36*a* at the lower end of its path of travel. However, if the article is entirely removed, the force of the return spring for plate 36*a* is sufficient to cause the extension 77 to slide past the substantially triangular-shaped ear 38*a*. It is seen also, that any prying action upon the divider bars of the selective mechanism will impart a sufficient upward force to the plate 36*a* to cause release of the extension 77 against the holding action of the spring (as seen at 60 in Figs. 1 and 2) for the locking plate 38*b*.

Having thus described the invention what is claimed as new and desired to be secured by Letters Patent is:

1. In captive mechanism for vending machines, a support; a series of reciprocable devices carried by the support; resilient means yieldably biasing the devices in one direction to one end of the path of travel thereof; releasable lock means normally holding the devices against movement in the opposite direction to the opposite end of said path of travel; means for releasing said lock means, permitting movement of the devices in said opposite direction to said opposite end of said path of travel against the action of said resilient means; and structure for holding said devices intermediate said ends of said path of travel and against return movement in said one direction under influence of said resilient means upon gradual release of the devices, said structure including stop means within the path of movement of one of said devices in said one direction for engagement therewith when the devices are released gradually, and having parts yieldable in response to the force of said resilient means when the devices are released suddenly, whereby said structure is incapable of holding the one device upon sudden release of the devices, said stop means being on the support, said structure having a member movable on the one device to a position clearing the stop means.

2. In captive mechanism as set forth in claim 1 wherein is provided swingable means carried by said one device and operably coupled with said member for releasing the latter when the force of said resilient means is supplemented.

3. In captive mechanism as set forth in claim 2 wherein said member is swingably carried by said swingable means.

4. In captive mechanism for vending machines, a support; a series of reciprocable devices carried by the support; resilient means yieldably biasing the devices in one direction; releasable lock means normally holding the devices against movement in the opposite direction; means for releasing said lock means, permitting movement of the devices in said opposite direction against the action of said resilient means; and structure swingably carried by one of said devices and engageable with said support upon gradual release of the devices for holding the latter against movement to a normal position under influence of said resilient means, said structure being provided with counterweight means for swinging the same to a position clearing the support for movement of the devices to said normal position upon sudden release of the devices.

5. In captive mechanism for vending machines, a support; a series of reciprocable devices carried by the support; resilient means yieldably biasing the devices in one direction; releasable lock means normally holding the devices against movement in the opposite direction; means for releasing said lock means, permitting movement of the devices in said opposite direction against the action of said resilient means; and structure carried by one of said devices and provided with spring means yieldably holding the same in a position for engagement with said support upon gradual release of the devices for holding the latter against movement to a normal position under influence of said resilient means, said structure being movable to a position clearing the support for movement of the devices to said normal position upon sudden release of the devices.

6. In captive mechanism for vending machines, a support; a series of reciprocable devices carried by the support; resilient means yieldably biasing the devices in one direction; releasable lock means normally holding the devices against movement in the opposite direction; means for releasing said lock means, permitting movement of the devices in said opposite direction against the action of said resilient means; and structure swingably carried by one of said devices and provided with spring means yieldably holding the same in a position for engagement with said support upon gradual release of the devices for holding the latter against movement to a normal position under influence of said resilient means, said structure being provided with counterweight means for swinging the same against the action of said spring means to a position clearing the support for movement of the devices to said normal position upon sudden release of the devices.

7. In captive mechanism as set forth in claim 6 wherein is provided spring-loaded, swingable means carried by said one device and operably coupled with said structure for releasing the latter when the force of said resilient means is supplemented sufficiently to overcome the spring of said swingable means.

8. In captive mechanism as set forth in claim 7 wherein said structure is supported entirely by said swingable means.

References Cited in the file of this patent

UNITED STATES PATENTS

| | | |
|---|---|---|
| 965,290 | Garson | July 26, 1910 |
| 2,727,654 | Childers et al. | Dec. 20, 1955 |
| 2,766,906 | Bookout et al. | Oct. 16, 1956 |

FOREIGN PATENTS

| | | |
|---|---|---|
| 387,163 | Great Britain | Mar. 18, 1932 |